(12) United States Patent
Tsuda et al.

(10) Patent No.: US 7,319,678 B2
(45) Date of Patent: Jan. 15, 2008

(54) MOBILE TERMINAL USING PRIORITY PROCESSING FOR PACKETS THAT REQUIRE URGENCY IN COMMUNICATIONS

(75) Inventors: Yoshiyuki Tsuda, Kanagawa (JP); Atsushi Inoue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1065 days.

(21) Appl. No.: 10/162,609

(22) Filed: Jun. 6, 2002

(65) Prior Publication Data

US 2003/0007475 A1 Jan. 9, 2003

(30) Foreign Application Priority Data

Jun. 7, 2001 (JP) ............................ P2001-172178
Jun. 4, 2002 (JP) ............................ P2002-163379

(51) Int. Cl.
*H04Q 7/00* (2006.01)
(52) U.S. Cl. .................... 370/328; 370/349; 455/550.1
(58) Field of Classification Search ..................... None
See application file for complete search history.

(56) References Cited

U.S. PATENT DOCUMENTS 6,587,882 B1 * 7/2003 Inoue et al. ................. 709/227
6,614,772 B1 * 9/2003 Sexton et al. ................ 370/335
6,701,361 B1 * 3/2004 Meier .......................... 709/224
6,721,805 B1 * 4/2004 Bhagwat et al. ............. 709/250
6,738,361 B1 * 5/2004 Immonen et al. ........... 370/328
6,763,012 B1 * 7/2004 Lord et al. ................... 370/338
6,847,819 B1 * 1/2005 Sprigg et al. ................ 455/445
6,947,431 B1 * 9/2005 Bergeron et al. ............ 370/401
6,976,054 B1 * 12/2005 Lavian et al. ................ 709/203
7,006,472 B1 * 2/2006 Immonen et al. ........... 370/332
2002/0012329 A1 * 1/2002 Atkinson et al. ............ 370/330

OTHER PUBLICATIONS

"IP Mobility Support", RFC 2002, Oct. 1996, pp. 1-79 (total of -40-pages).

* cited by examiner

*Primary Examiner*—Bob A. Phunkulh
(74) *Attorney, Agent, or Firm*—Oblon, Spivak, McClelland, Maier & Neustadt, P.C.

(57) ABSTRACT

A mobile terminal capable of carrying out communications while moving among a plurality of interconnected subnets is provided with a TCP/IP driver configured to carry out processing of communication packets; and a control related driver configured to carry out processing of control related packets that require urgency in communications, at higher priority than the communication packets, without using the TCP/IP driver. The control related packets may include Mobile IP packets and DHCP packets.

19 Claims, 7 Drawing Sheets

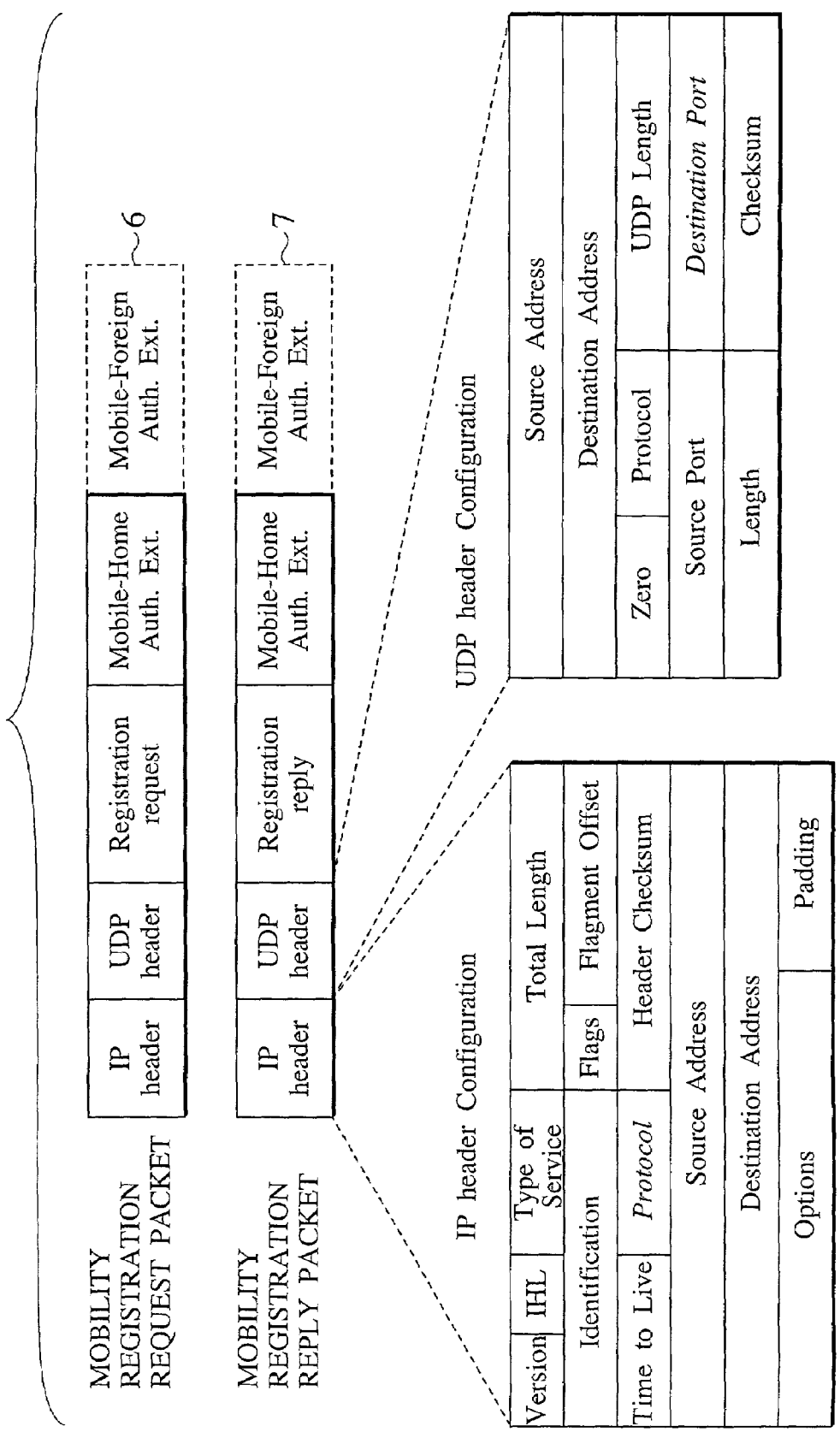

MOBILE TERMINAL USING PRIORITY PROCESSING FOR PACKETS THAT REQUIRE URGENCY IN COMMUNICATIONS

BACKGROUND OF THE INVENTION

1. Field of the Invention

The present invention relates to a mobile terminal compatible with the IETF Mobile IP protocol that supports the mobility of mobile terminals in the Internet.

2. Description of the Related Art

For the mobile terminals to be connected to the Internet, the products according to the RFC 2002/3220 issued by the IETF (Internet Engineering Task Force) are increasing. FIG. 4 shows an exemplary configuration according to the IETF Mobile IP protocol as defined by RFC 2002/3220 that supports the mobility between subnets. A mobile terminal (Mobile Node: MN) 22 acquires an IP address (care-of address) to be used temporarily at a visited site subnet by using a DHCP (Dynamic Host Configuration Protocol) or the like. Then, the mobile terminal 22 transmits a mobility registration request (registration request: RRQ) 25 for registering information regarding the moving to a home agent (HA) 24. At this point, the transmission may be made either via a foreign agent (FA) 23 or directly to the home agent 24 at the subnet.

Here, the DHCP is a mechanism for allocating an IP address to a communication node on the Internet. Normally, a DHCP server exists on the network and allocates an IP address in response to a request from the communication node. According to this mechanism, there is no need to assign a fixed IP address to the communication node side in advance. The communication node is a terminal or network device connected to the network such as a mobile terminal, for example. Regardless of whether the mobility registration is successful or not, the home agent 24 transmits a mobility registration replay packet (registration reply: RRP) 26 to the mobile terminal 22 that has sent the mobility registration request (RRQ) 25. This mobility registration is an important step for making a location of the mobile terminal (MN) 22 apparent.

FIG. 6 shows an exemplary internal configuration of a conventional mobile terminal, which comprises a TCP/IP driver 1 for controlling the TCP/IP stack, a general application program 2 operated on the mobile terminal, a Mobile IP management program 3 for carrying out processing related to the Mobile IP, a network driver 4 for controlling a network card, and a network card 5 for carrying out physical Ethernet accesses.

Conventionally, the Mobile IP management program 3 implemented on the mobile terminal is carrying out communications related to the mobile IP by utilizing functions of the TCP/IP driver that is normally provided in the generally utilized OS (Operating System). This is often realized through a socket according to the WinSock specification, for example. The WinSock is a communication interface specification defined among vendors who provides softwares for processing the TCP/IP stack. The communications for setting up a connection with a communication node through such a socket can be realized relatively easily. However, such a processing within the OS presupposes the use for the general purpose, so that it is not necessarily usable exactly as intended.

The Mobile IP related packets include a mobility registration request (RRQ) packet and a mobility registration reply (RRP) packet. The Mobile IP management program 3 exchanges data with the TCP/IP driver 1 by using the socket of the TCP/IP driver provided in the OS. Then, a connection for communications with the home agent existing on the network has been established via the network driver 4 and the network card 5.

As such, the Mobile IP related packet communications that require urgency have conventionally been processed without making any distinction from those for packets of the other general application program. The socket of the TCP/IP driver that is normally provided in the OS usually processes the requested communications sequentially as they are requested. Consequently, even when requests to the OS are made by a plurality of programs simultaneously, there has conventionally been some possibility by which the packets that require urgency will not be processed at appropriate timings, as described above.

In order to avoid the above described problem, it is possible to prioritize specific packets. However, in this case, there is a need to carry out the priority control according to types of the received packets and the processing itself often becomes complicated. This can also be a cause for degrading the communication speed of the mobile terminal. In addition, even if the above described improvement is made at the application side, hardly any effect can be expected for the reason described above as long as the socket provided by the OS is used.

Also, in order for the mobile terminal to carry out communications while moving through connection target subnets, there is a need to acquire a temporal IP address (care-of address) by using the DHCP or the like at the visited site subnet. This temporal IP address is an IP address that must be acquired by the mobile terminal in order to carry out communications at a newly connected subnet. The similar considerations as in the case of the Mobile IP are also necessary for the exchange of packets regarding the DHCP or the like to acquire this temporal IP address.

Thus, the conventional communication function of the mobile terminal has been associated with the problems that the packets that require urgency such as those of the Mobile IP are not processed at appropriate timings or that the communication efficiency is insufficient.

Also, in the Mobile IP of the IPv6, a network prefix advertisement (neighbor advertisement) from an upstream router instead of DHCP, a neighbor solicitation packet by which the terminal inquires the upstream router, and a binding update packet for notifying a new location information at a time of moving must be similarly handled as control related packets to be subjected to the priority control.

BRIEF SUMMARY OF THE INVENTION

It is therefore an object of the present invention to provide a mobile terminal capable of stabilizing the mobile communications by processing packets that require urgency at higher priority without degrading the communication efficiency.

According to one aspect of the present invention there is provided a mobile terminal capable of carrying out communications while moving among a plurality of interconnected subnets, mobile terminal comprising: a TCP/IP driver configured to carry out processing of communication packets; and a control related driver configured to carry out processing of control related packets that require urgency in communications, at higher priority than the communication packets, without using the TCP/IP driver.

According to another aspect of the present invention there is provided a communication method of a mobile terminal capable of carrying-out communications while moving among a plurality of interconnected subnets, the communication method comprising: carrying out processing of communication packets by a TCP/IP driver; and carrying out processing of control related packets that require urgency in communications, by a control related driver at higher priority than the communication packets, without using the TCP/IP driver.

According to another aspect of the present invention there is provided a control related driver for a mobile terminal capable of carrying out communications while moving among a plurality of interconnected subnets, the control related driver comprising: a packet judgement unit configured to judge whether a received packet is a communication packet or a control related packet that requires urgency in communications; and a control related packet processing unit configured to carry out processing of control related packets that require urgency in communications, at higher priority than communication packets to be processed by a TCP/IP driver of the mobile terminal.

According to another aspect of the present invention there is provided a processing method of a control related driver for a mobile terminal capable of carrying out communications while moving among a plurality of interconnected subnets, the processing method comprising: judging whether a received packet is a communication packet or a control related packet that requires urgency in communications; and carrying out processing of control related packets that require urgency in communications, at higher priority than communication packets to be processed by a TCP/IP driver of the mobile terminal.

According to another aspect of the present invention there is provided a computer program product for causing a computer to function as a control related driver for a mobile terminal capable of carrying out communications while moving among a plurality of interconnected subnets, the computer program product comprising: a first computer program code for causing the computer to judge whether a received packet is a communication packet or a control related packet that requires urgency in communications; and a second computer program code for causing the computer to carry out processing of control related packets that require urgency in communications, at higher priority than communication packets to be processed by a TCP/IP driver of the mobile terminal.

Other features and advantages of the present invention will become apparent from the following description taken in conjunction with the accompanying drawings.

BRIEF DESCRIPTION OF THE DRAWINGS

FIG. 7 is a diagram showing exemplary formats of a mobility registration request packet and a mobility registration reply packet that can be used by the mobile terminal of FIG. 1.

DETAILED DESCRIPTION OF THE INVENTION

Referring now to FIG. 1 to FIG. 7, one embodiment of a mobile terminal according to the present invention will be described in detail.

Figure 1:
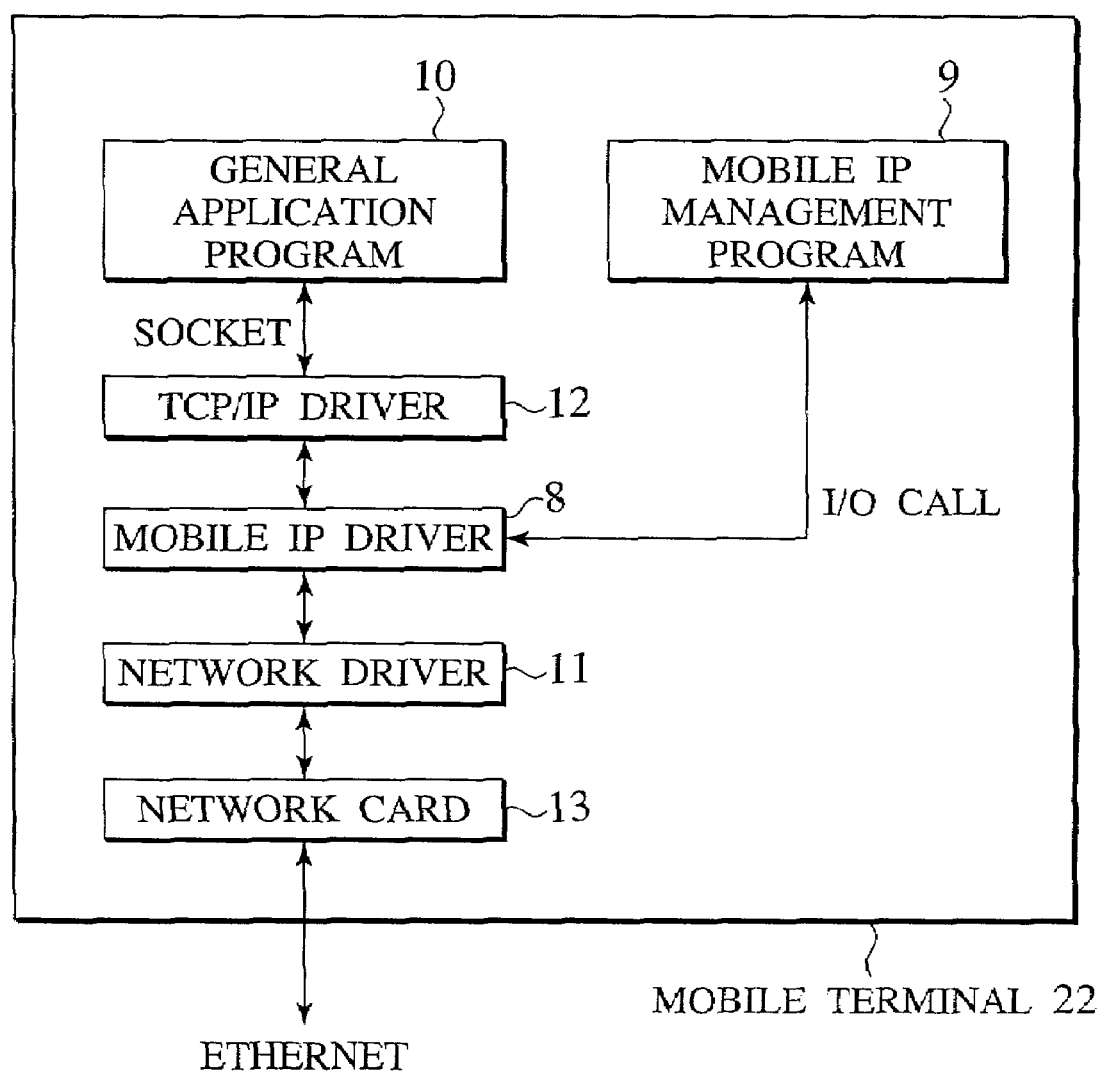
FIG. 1 is a block diagram showing an exemplary configuration of a mobile terminal according to one embodiment of the present invention.

FIG. 1 shows a mobile terminal 22 according to this embodiment, which comprises a Mobile IP driver 8 for carrying out the processing of the Mobile IP at higher priority, a Mobile IP management program 9 for carrying out a control of the Mobile IP, a general application program 10, a network driver 11 for controlling a network card 13, a TCP/IP driver 12 for processing the TCP/IP stack, and a network card 13 through which the mobile terminal 22 is connected to an Ethernet that is the physical communication network.

As shown in FIG. 1, the mobile terminal 22 of this embodiment has a configuration in which the Mobile IP driver 8 is inserted between the TCP/IP driver 12 and the network driver 11. The TCP/IP driver 12 is a program for processing the TCP/IP stack that is generally provided in association with the OS implemented on the mobile terminal 22. An API (Application Interface) to be used by the application program 10 on an upper level of the TCP/IP driver 12 for the purpose of exchanging data with the TCP/IP driver 12 is called a socket. Also, in FIG. 1, the Mobile IP driver 8 is arranged at a lower level than the TCP/IP driver 12 in order to eliminate influences of the TCP/IP driver 12. Here, the network driver 11 is usually a program to be used for the purpose of controlling the network card 13. The network card 13 is to be commonly utilized by the entire mobile terminal, so that its control program, i.e., the network driver 11, is arranged at a commonly used level, i.e., below the Mobile IP driver 8.

First, the case of transmitting a packet from the general application program 10 that is operated on the mobile terminal will be described. The data for which the transmission is requested from the application program 10 are transferred to the TCP/IP driver 12 through a socket provided at the TCP/IP driver 12 by the OS. Here, a packet of the TCP/IP is generated and further transferred to the mobile IP driver 8. The packet so transferred is a general packet other than those of the Mobile IP so that the Mobile IP driver 8 usually transfers it as it is to the next network driver 11.

On the other hand, the case where the general application program 10 receives a packet will be described next. A received packet acquired through the network card 13 from the Ethernet is first transferred from the network driver 11 to the Mobile IP driver 8. Upon receiving this packet, the Mobile IP driver 8 transfers the transferred packet as it is to the TCP/IP driver 12. Then, the application program 10 acquires the data from the TCP/IP driver 12 through a socket.

Next, the case where the Mobile IP management program 9 transmits a packet that requires urgency such as the mobility registration request (RRQ) packet as defined by the Mobile IP will be described. The above described packet transmission request is usually issued from the Mobile IP management program 9. This request is directly given to the Mobile IP driver 8. Upon receiving this packet, the Mobile IP driver 8 generates a mobility registration request (RRQ) packet, and transfers this mobility registration request (RRQ) packet to the network driver 11 at a higher priority than transfer requests from the TCP/IP driver 12.

The operation by which the Mobile IP driver 8 processes the Mobile IP packets at higher priority than packets transferred from the TCP/IP driver 12 is continued in principle until the registration to the home agent by the mobility registration request (RRQ) transmitted earlier succeeds. At this point, the transmission packets requested by the general application program 10 are controlled to be either discarded or stored into a queue.

On the other hand, the case where the Mobile IP management program 9 receives a mobility registration reply (RRP) packet as defined by the Mobile IP from an agent on a network will be described, The Mobile IP driver 8 that receives a packet of the Mobile IP from the network driver 11 interprets the packet and directly transfer it to the Mobile IP management program 9.

Here, the packet such as that of the Mobile IP that requires urgency in the communications on the mobile terminal will be referred to as a control related packet for the sake of convenience. In general, the control related packets are packets for changing a state, acquiring an address, or updating a current location information in accordance with a change of a location of the mobile terminal.

The mobile terminal also needs to acquire the temporal address (care-of address) by using the DHCP or the like at the visited site subnet. The DHCP is a generally used protocol, but its packets can be classified as the control related packets that require urgency at the mobile terminal of the present invention because they are deeply related to the acquisition of the temporal address (care-of address). The description up to this point has been directed to the processing of the Mobile IP packets, but the Mobile IP driver 8 also carries out the processing similar to that for the Mobile IP packets, with respect to packets as defined by the DHCP just as well for the above described reason.

The mobile terminal according to the Mobile IP transmits a mobility registration request (RRQ) packet to the home agent in order to notify the location of the mobile terminal itself when it is recognized that the connected subnet has been changed. At this point, in order to transmit the mobility registration request (RRQ), the Mobile IP management program 9 in the mobile terminal calls up an interface function such as I/O Control or the like and commands the transmission to the Mobile IP driver 8.

When the command is directly given from the Mobile IP management program 9 as described above, the Mobile IP driver 8 carries out the processing for transmitting the mobility registration request (RRQ) at higher priority than the packets requested by the general application program 10. Then, the mobility registration request (RRQ) packet generated by the Mobile IP driver 8 is transferred to the network driver 11 for the purpose of the transmission.

At this point, the Mobile IP driver 8 may interrupt the transmission and reception processing for packets other than the control related packets that require urgency such as the mobility registration request (RRQ) packet and the mobility registration reply (RRP) packet, during the period since a timing at which the change of the connected subnet of the mobile terminal is detected until a notice of the success of the registration for the mobility registration request (RRQ) that is to be transmitted from the home agent is received.

Namely, when there is a possibility for the change of the connected subnet, the Mobile IP driver 8 may not carry out the processing of the packets requested by the general application program 10 that are transferred from the TCP/IP driver 12. For example, the Mobile IP driver 8 can store the transferred transmission packets into a queue provided in a region managed by the Mobile IP driver 8, and maintain them until the mobility registration is completed. Here, an upper limit for a queuing capacity may be set for the queue. When packets in excess of this upper limit are queued, either the last packet that is tried to be entered into the queue or the oldest packet in the queue can be discarded. The packets stored in the queue are sequentially processed by the Mobile IP driver 8 after the mobility registration is completed. On the other hand, it is also possible to discard all the packets transferred from the TCP/IP driver 12 during this period without using the queue. The above described handling of the control related packets in contrast to the general packets will be referred to as the priority processing of the control related packets.

In practice, the packets to be the target of the priority processing by the Mobile IP driver 8 can include the following.

(1) Packets as defined by the Mobile IP
(2) Packets as defined by the DHCP

In order to distinguish these packets by using the received communication packets alone, they can be identified by checking the protocol number and the destination port number contained in the packet header. FIG. 7 shows exemplary Mobile IP packets, where information to be used for this judgement is attached at a top of each packet. It suffices to select a packet for which the Protocol portion of the IP header indicates UDP as the protocol number and the Destination Port of the UDP header indicates a port defined for the respective protocol as the destination port number.

Figure 4:
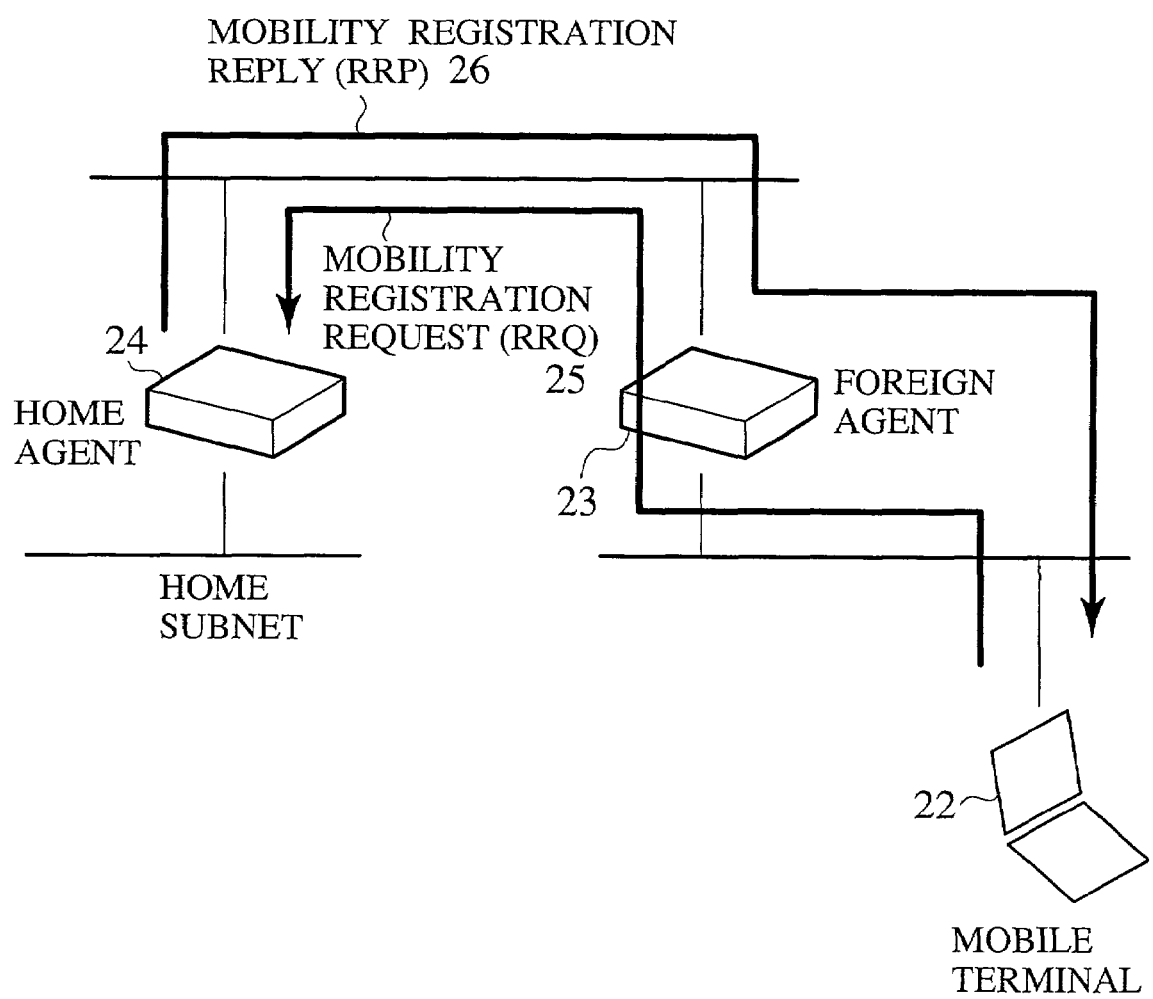
FIG. 4 is a schematic diagram showing an exemplary Mobile IP system in which the mobile terminal of FIG. 1 can be used.

In the following, the operation of one embodiment of the present invention will be described with reference to FIG. 4, which shows an exemplary Mobile IP system including the mobile terminal 22, the foreign agent 23, the home agent 24, the mobility registration request 25 and the mobility registration reply 26.

According to the specification of the Mobile IP as defined by RFC 2002/3220, the mobile terminal 22 behaves as follows when the connected subnet is changed. The mobile terminal 22 receives an agent advertisement transmitted from the foreign agent (FA) 23 existing on the newly connected subnet. At this point, the mobile terminal recognizes that the connected subnet has been changed. Then, the mobile terminal 22 acquires a temporal address (FA care-of address) contained in the agent advertisement transmitted from the foreign agent 23. When there is no foreign agent, an address to be temporarily used (co-located care-of address) is acquired by using the DHCP or the like. Then, the mobile terminal 22 transmits the acquired temporal address to the home agent (HA) 24 as the mobility registration request (RRQ) 25.

The packet for the mobility registration request (RRQ) 25 has a format 6 shown in FIG. 7. This packet contains a header information according to the TCP/IP, a registration request, and an extension information to be added by the agent. This information is handled as indicating a location of the mobile terminal 22, and subsequently used for communications with the mobile terminal 22 via the home agent 24.

The home agent 24 that received the registration request processes the registration request indicated by the mobility registration request (RRQ) of the mobile terminal 22. Then, the home agent 24 notifies success or failure of the registration by the packet of the mobility registration reply (RRP) 26 in a format 7 shown in FIG. 7. The mobility registration reply (RRP) packet has almost the same format as the mobility registration request (RRQ) packet except that the registration request is replaced by the registration reply.

Figure 5:
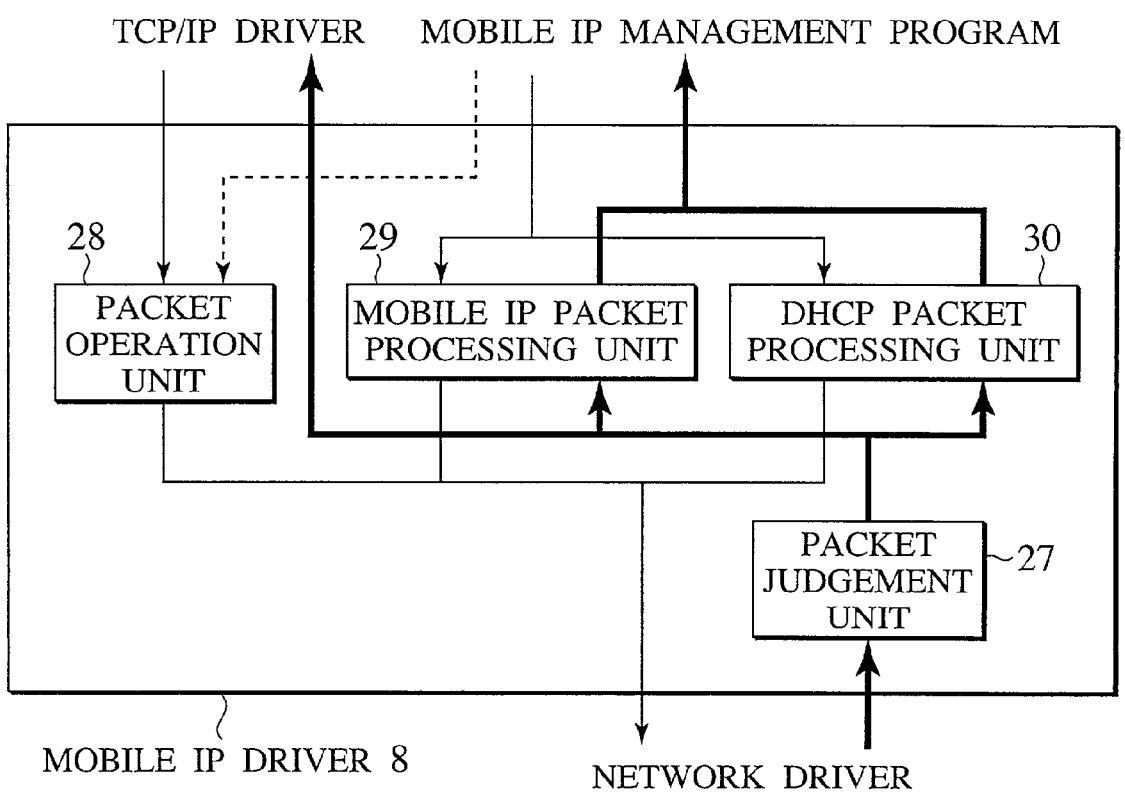
FIG. 5 is a block diagram showing an exemplary configuration of a Mobile IP driver in the mobile terminal of FIG. 1.
Figure 6:
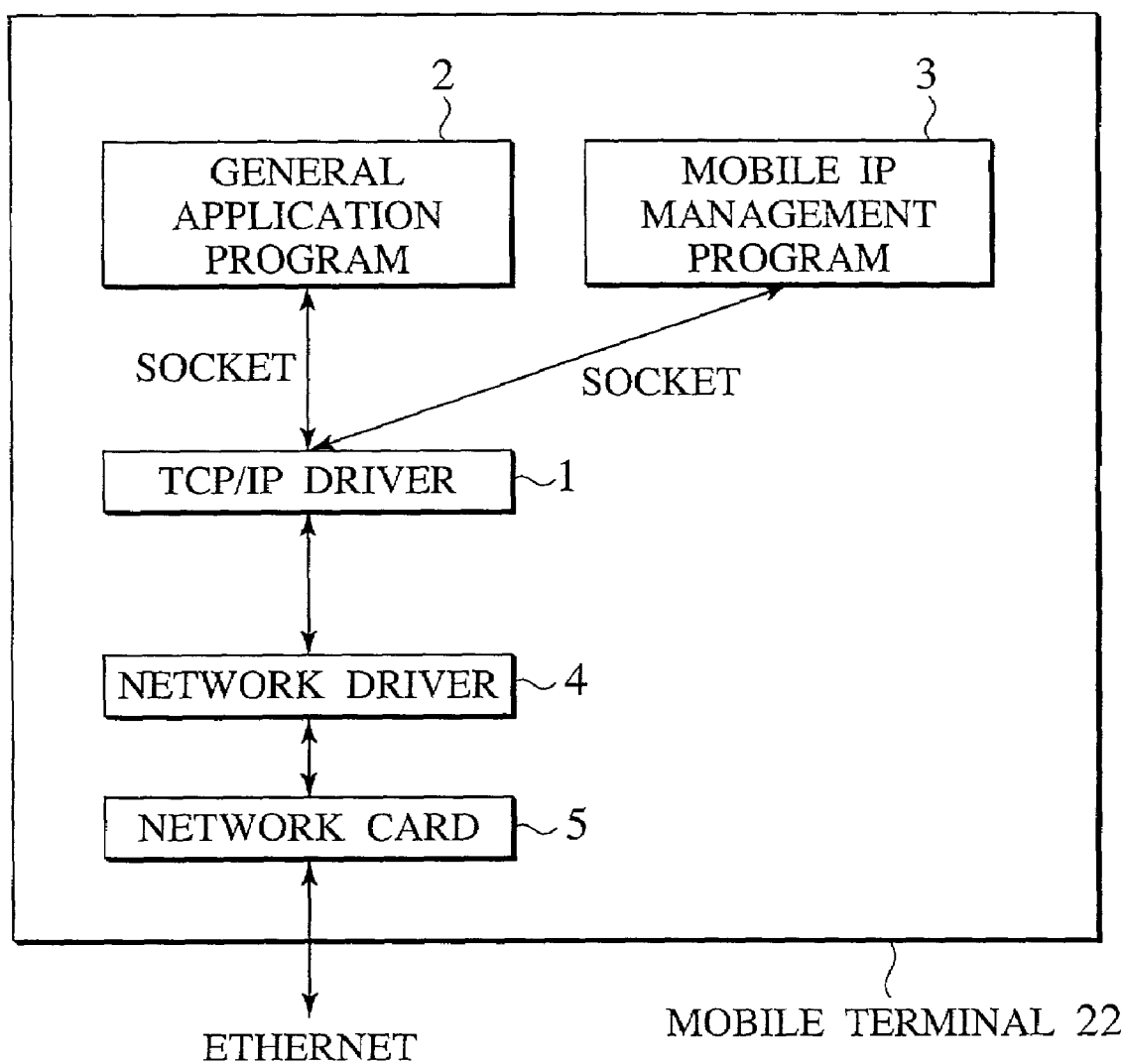
FIG. 6 is a block diagram showing an exemplary configuration of a conventional mobile terminal.

Next, FIG. 5 shows an exemplary functional configuration of the Mobile IP driver 8 in the mobile terminal of FIG. 1. The Mobile IP driver 8 has different processing flows for the received packets and the transmission packets, as well as for the control related packets and the other packets. The Mobile IP driver 8 has a packet judgement unit 27 for judging whether a packet from the network driver 11 is a control related packet or not, a Mobile IP packet processing unit 29 and a DHCP packet processing unit 30 for processing the Mobile IP packets and the DHCP packets, respectively, that are regarded as the control related packets in this embodiment, and a packet operation unit 28 for carrying out the queuing and the discarding of the transmission packets other than the control related packets according to the need.

The packet judgement unit 27 supplies the received packet transferred from the network driver 11 to the Mobile IP packet processing unit 29 or the DHCP packet processing unit 30 if it is the Mobile IP packet or the DHCP packet, respectively, and then transfers it to the Mobile IP management program 9 of FIG. 1. If it is the other packet, it is transferred to the TCP/IP driver 12 of FIG. 1. It is also possible to carry out operations such as passing, queuing, or discarding of the transmission packet transferred from the TCP/IP driver 12 of FIG. 1, according to a command from the Mobile IP management program 9 of FIG. 1.

Figure 2:
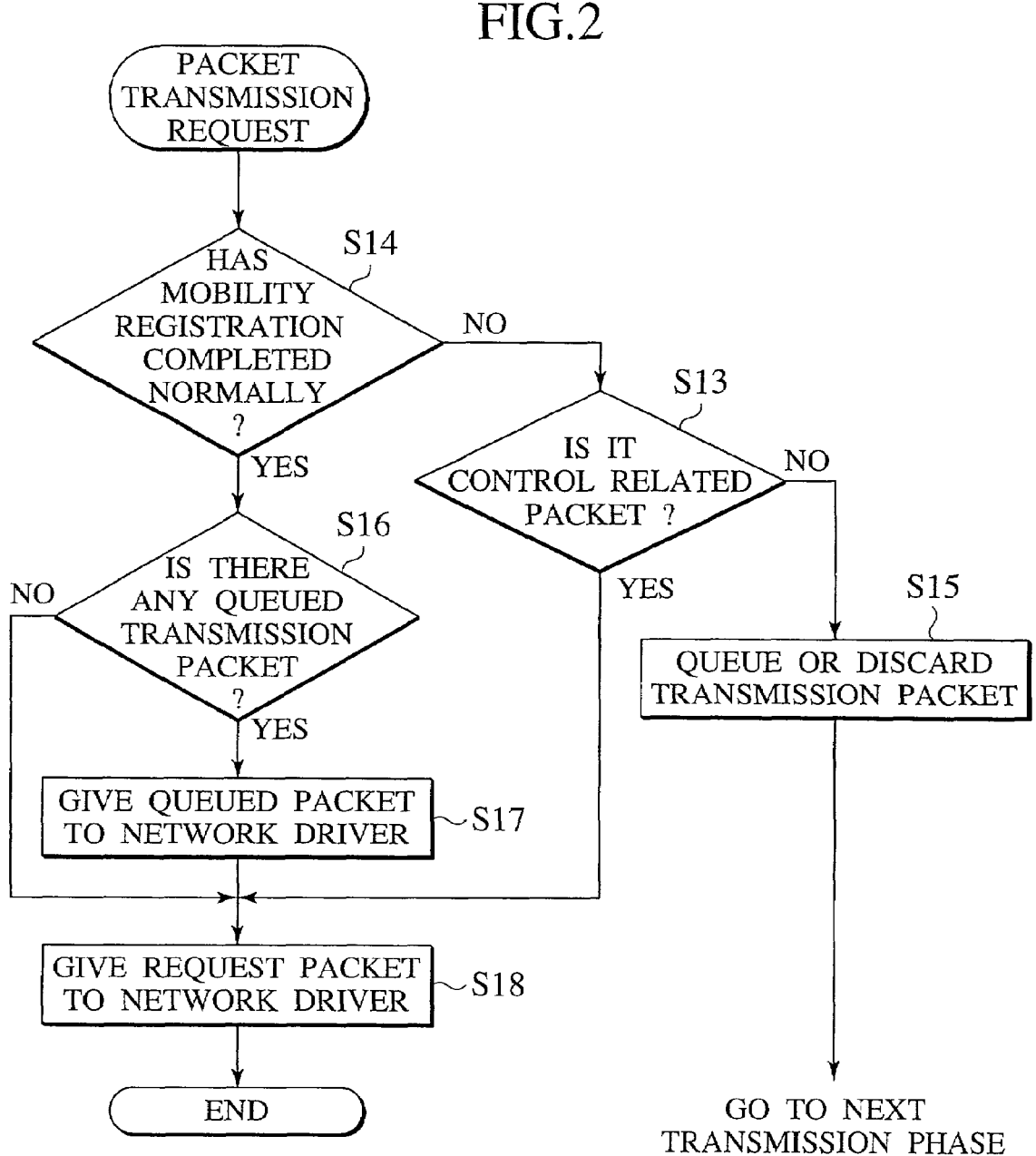
FIG. 2 is a flow chart showing a processing flow of a Mobile IP driver in the mobile terminal of FIG. 1 at a time of transmitting a packet.

FIG. 2 shows the processing flow of the Mobile IP driver 8 at a time of transmitting a packet. When the packet transmission request is received, the Mobile IP driver 8 judges whether the mobility registration has been completed normally or not at the step S14. As already described, when the mobile terminal 22 transmitted the mobility registration request (RRQ) to the home agent 24, the home agent 24 returns the mobility registration reply (RRP) indicating the registration result. The judgement at the step S14 is made by checking this mobility registration reply (RRP).

After the mobile terminal 22 has moved to the new subnet, the control related packets that require urgency are processed immediately by the Mobile IP driver 8 until the mobility registration is completed, and given to the network driver 11 such that they are transmitted to the home agent 24 or the like on the network immediately. The control related packets that require urgency are processed by the Mobile IP management program 9 so that the step S13 judges whether it is a control related packet or not by checking whether it is directly given from the Mobile IP management program 9 or not. When the packet to be transmitted is a transmission packet of the general application program, it is transferred to the Mobile IP driver 8 from the TCP/IP driver 12, so that it can be judged as not a control related packet at the step S13.

While the mobility registration reply (RRP) is not received yet or the mobility registration processing has failed so that the mobility registration is not completed normally yet, the processing for queuing or discarding the transmission packet of the general application program is carried out at the step S15. At this point, the Mobile IP driver 8 either continues to wait for the mobility registration reply (RRP) to come, or carries out the next processing while storing that packet in the queue when the packet is queued at the step S15.

When it is judged that the mobility registration has completed normally at the step S14, whether there is any non-transmitted transmission packet or not is judged at the step S16. Here, if there is a non-transmitted transmission packet exists in the queue, it implies that the transmission packet queued by the processing of the step S15 is still remaining in the queue. Consequently, the non-transmitted transmission packet that is remaining in the queue is given to the network driver 11 at the step S17. Then, the non-transmitted transmission packet received by the Mobile IP driver 8 is processed at the step S18.

When there is no transmission packet that is remaining in the queue exists at the step S16, the transmission is carried out simply through the step S18.

Apart from the mechanism described above, there is also a mechanism in which the mobile terminal detects the change of the connected subnet by sensing the change of a state. In the configuration of FIG. 1, when the wired network such as the Ethernet is used, for example, the network driver 11 can send a notice of a state change such as that for having a line connected to a hub, to the Mobile IP driver 8.

Upon receiving this notice, the Mobile IP driver 8 recognizes the change of the connected subnet and transmits a signal to the Mobile IP management program 9. Upon receiving this signal, the Mobile IP management program 9 can command the interruption of the processing for the packets of the general application program 10 to the Mobile IP driver 8, similarly as in the processing flow described above. Then, when the mobility registration is completed normally, the resuming of the processing for the packets of the general application program 10 can be commanded.

It is sufficient to carry out the above described priority processing of the Mobile IP related packets such as the mobility registration request (RRQ) packet only once initially when a possibility of the change of the connected subnet of the mobile terminal is recognized. There is a need for the update processing with respect to the home agent by using the second and subsequent mobility registration request (RRQ) packets, but the same processing as the packets of the general application program can be carried out at such occasions. This is because, unlike the initial occasion, it suffices for the second and subsequent occasions to complete the update processing of the mobility registration information until the lifetime of the mobility registration information expires.

Next, the case where the mobile terminal receives the mobility registration reply (RRP) packet will be described. When the mobility registration reply packet is received from the network driver 11, the mobile IP driver 8 processes this packet and transfers the content of the mobility registration reply (RRP) packet directly to the Mobile IP management program 9.

Figure 3:
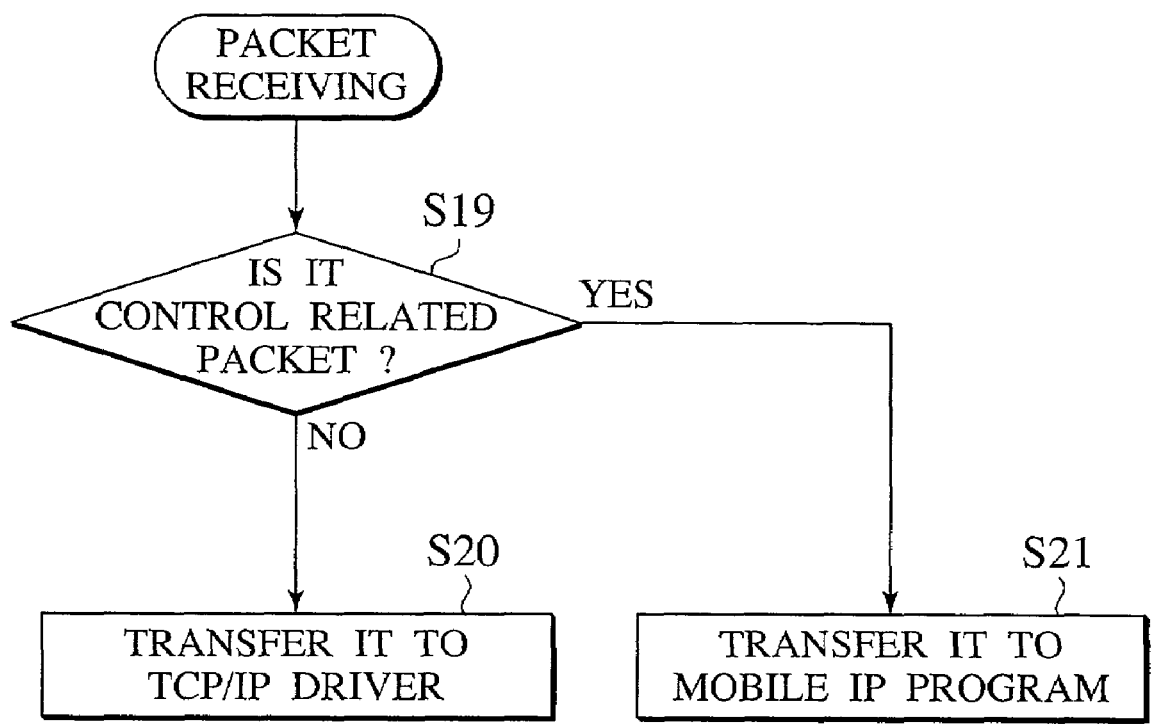
FIG. 3 is a flow chart showing a processing flow of a Mobile IP driver in the mobile terminal of FIG. 1 at a time of receiving a packet.

FIG. 3 shows the processing flow of the Mobile IP driver 8 at a time of receiving a packet. When the mobile terminal 22 received the packet, whether that received packet is a control related packet or not is judged at the step S19. In the case of receiving the packet, what type of the packet is coming is not known in advance, so that the judgement is made by checking the header information of the received packet. More specifically, as shown in FIG. 7, a packet for which the Protocol portion of the IP header indicates UDP and the Destination Port of the UDP header indicates a port defined for the Mobile IP or the DHCP can be judged as a control related packet. When it is judged as the control related packet, this packet is transferred to the Mobile IP program at the step S21. If it is a general packet such as a packet of the general application program, this packet is transferred to the TCP/IP driver 12 at the step S20.

Next, a concrete example of transmitting the mobility registration reply (RRP) information from the Mobile IP driver 8 to the Mobile IP management program 9 shown in FIG. 1 will be described. The Mobile IP management program 9 calls up the Mobile IP driver 8 and carries out a reading operation of the data in advance, or executes an I/O read function in advance.

The Mobile IP driver 8 keeps the reading operation or the I/O read function execution in a suspended state rather than finishing it immediately. When the mobile terminal receives the mobility registration reply (RRP) packet in this state, the Mobile IP driver 8 stores the information contained in this packet to a reading region provided and managed by the Mobile IP driver 8, and resumes the reading operation of the I/O read function execution in the suspended state. The Mobile IP management program 9 can receive the content of the mobility registration reply (RRP) by scanning the reading region managed by the Mobile IP driver 8 when the control of the reading operation or the I/O read function execution is returned.

Note that the above described method for transmitting the mobility registration reply (RRP) from the Mobile IP driver 8 to the Mobile IP management program 9 using the reading operation or the I/O read function is only an example, and it is also possible to use a method using the up-call or the like.

In the case of acquiring an address to be temporarily used (co-located care-of address) at the visited site subnet by using the DHCP, the priority processing of the DHCP related packets will be carried out similarly as described above.

The DHCP related transmission packets include DHCP-DISCOVER, DHCPREQUEST, DHCPDECLINE, DHCPRELEASE, DHCPINFORM, etc. Namely, when any of these packets is to be transmitted from the mobile terminal, it is transferred directly from the Mobile IP management program 9 to the Mobile IP driver 8. Similarly as in the above, the communication processing for such a packet will then be carried out at higher priority than the packets of the other general application programs.

Also, the DHCP related received packets include DHCPOFFER, DHCPACK, DHCPNAK, DHCPINFORM, etc. When the mobile terminal receives any of these packets, it is transferred from the network driver 11 to the Mobile IP driver 8. The Mobile IP driver 8 checks the header information of the received packet, and transfers it directly to the Mobile IP management program 9 after processing it if it is any one of the above described packets. At this point, the method for judging the header information can be the same as described above for the Mobile IP.

As described, according to the present invention, the mobility registration request (RRQ) packet is transferred directly from the Mobile IP management program to the Mobile IP driver. Then, it is processed at higher priority than the packets of the general application program and transferred to the network driver. In this way, the Mobile IP packet such as the mobility registration request (RRQ) packet can be transmitted immediately when the change of the connected subnet occurs.

The case of acquiring the care-of address in the IPv6 by acquiring a network prefix using the neighbor advertisement or the neighbor solicitation and carrying out an address automatic configuration can be handled similarly, such that the smooth address acquisition at the visited site can be realized by processing the ICMP packet for the neighbor advertisement or the neighbor solicitation at the Mobile IP driver. Also, the binding update message packet for updating the binding cache content which is a location information cache to be used for the route optimization can be handled similarly such that the smooth location information update can be realized.

Also, when the mobile terminal receives the Mobile IP packet such as the mobility registration reply (RRP) packet, the Mobile IP driver transfers it to the Mobile IP management program immediately after processing it. Consequently, the Mobile IP management program can receive the Mobile IP information such as that of the mobility registration reply (RRP) packet immediately.

Also, the processing at higher priority than the general packets is carried out for the packets related to the DHCP. Consequently, in the case of acquiring an address to be temporarily used (co-located care-of address) at the visited site subnet by using the DHCP or the like, it is possible to acquire the address to be temporarily used immediately after the moving to the visited site subnet.

In this way, the processing related to the Mobile IP can be carried out quickly and surely at the mobile terminal, so that it is possible to provide a stable mobile terminal It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the Mobile IP driver of the mobile terminal of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile terminal capable of carrying out communications while moving among a plurality of interconnected subnets, the mobile terminal comprising:
   a TCP/IP driver configured to carry out processing of communication packets according to a general application program;
   a network driver configured to connect the mobile terminal to a network; and
   a control related driver connected between the TCP/IP driver and the network driver and configured to carry out processing of control related packets that require urgency in communications according to a mobile communication management program, by transferring the control related packets to/from the network driver at higher priority than the communication packets to be transferred between the TCP/IP driver and the network driver.

2. The mobile terminal of claim 1, wherein the control related driver is configured to judge whether a received packet is a communication packet or a control related packet, and transfers the received packet to the TCP/IP driver when the received packet is the communication packet.

3. The mobile terminal of claim 1, wherein the control related driver carries out the processing of the control related packets for changing a state, acquiring an address, or updating a current location information in accordance with a change of a location of the mobile terminal.

4. The mobile terminal of claim 1, wherein the control related driver carries out the processing of the control related packets that include Mobile IP packets and DHCP packets.

5. The mobile terminal of claim 1, wherein the control related driver carries out the processing of the control related packets that include neighbor advertisement packets and neighbor solicitation packets of IPv6, or binding update message packets of Mobile IPv6.

6. The mobile terminal of claim 1, wherein the control related driver is configured to generate the control related packet when the mobile terminal transmits the control related packet.

7. The mobile terminal of claim 1, wherein the control related driver is configured to interpret the control related packet without using the TCP/IP driver, and directly transfer the control related packet to a Mobile IP management program when the control related packet is received.

8. A communication method of a mobile terminal capable of carrying out communications while moving among a plurality of interconnected subnets, the communication method comprising:
   carrying out processing of communication packets by a TCP/IP driver according to a general application program; and
   carrying out processing of control related packets that require urgency in communications according to a mobile communication management program, by a control related driver connected between the TCP/IP driver and a network driver for connecting the mobile terminal to a network, by transferring the control related packets to/from the network driver at higher priority than the communication packets to be transferred between the TCP/IP driver and the network driver.

9. A control related driver for a mobile terminal capable of carrying out communications while moving among a plurality of interconnected subnets, the control related driver being connected between a TCP/IP driver for carrying out processing of communication packets according to a general application program and a network driver for connecting the mobile terminal to a network, and comprising:
   a packet judgement unit configured to judge whether a received packet is a communication packet or a control related packet that requires urgency in communications; and
   a control related packet processing unit configured to carry out processing of control related packets that require urgency in communications according to a mobile communication management program, by transferring the control related packets to/from the network driver at higher priority than communication packets to be transferred between the TCP/IP driver and the network driver.

10. A processing method of a control related driver for a mobile terminal capable of carrying out communications while moving among a plurality of interconnected subnets, the control related driver being connected between a TCP/IP driver for carrying out processing of communication packets according to a general application program and a network driver for connecting the mobile terminal to a network, and the processing method comprising:
   judging whether a received packet is a communication packet or a control related packet that requires urgency in communications; and
   carrying out processing of control related packets that require urgency in communications according to a mobile communication management program, by transferring the control related packets to/from the network driver at higher priority than communication packets to be transferred between the TCP/IP driver and the network driver.

11. A computer readable medium having computer readable program codes stored therein for causing a computer to function as a control related driver for a mobile terminal capable of carrying out communications while moving among a plurality of interconnected subnets, wherein the control related driver being connected between a TCP/IP driver for carrying out processing of communication packets according to a general application program and a network driver for connecting the mobile terminal to a network, and the computer readable program codes include:
   a first computer program code for causing the computer to judge whether a received packet is a communication packet or a control related packet that requires urgency in communications; and
   a second computer program code for causing the computer to carry out processing of control related packets that require urgency in communications according to a mobile communication management program, by transferring the control related packets to/from the network driver at higher priority than communication packets to be transferred between the TCP/IP driver and the network driver.

12. A mobile terminal capable of carrying out communications while moving among a plurality of interconnected subnets, the mobile terminal comprising:
   TCP/IP driver means for carrying out processing of communication packets according to the general application program;
   network driver means for connecting the mobile terminal to a network; and
   control related driver means connected between the TCP/IP driver means and the network driver means, for carrying out processing of control related packets that require urgency in communications according to a mobile communication management program, by transferring the control related packets to/from the network driver means at higher priority than the communication packets to be transferred between the TCP/IP driver means and the network driver means.

13. The mobile terminal of claim 12, wherein the control related driver means judges whether a received packet is a communication packet or a control related packet, and transfers the received packet to the TCP/IP driver means when the received packet is the communication packet.

14. The mobile terminal of claim 12, wherein the control related driver means carries out the processing of the control related packets for changing a state, acquiring an address, or updating a current location information in accordance with a change of a location of the mobile terminal.

15. The mobile terminal of claim 12, wherein the control related driver means carries out the processing of the control related packets that include Mobile IP packets and DHCP packets.

16. The mobile terminal of claim 12, wherein the control related driver means carries out the processing of the control related packets that include neighbor advertisement packets and neighbor solicitation packets of IPv6, or binding update message packets of Mobile IPv6.

17. The mobile terminal of claim 12, wherein the control related driver means generates the control related packet when the mobile terminal transmits the control related packet.

18. The mobile terminal of claim 12, wherein the control related driver means interprets the control related packet without using the TCP/IP driver means, and directly transfers the control related packet to a Mobile IP management program when the control related packet is received.

19. A control related driver for a mobile terminal capable of carrying out communications while moving among a plurality of interconnected subnets, the control related driver being connected between a TCP/IP driver for carrying out processing of communication packets according to a general application program and a network driver for connecting the mobile terminal to a network, and comprising:

packet judgement means for judging whether a received packet is a communication packet or a control related packet that requires urgency in communications; and control related packet processing means for carrying out processing of control related packets that require urgency in communications according to a mobile communication management program, by transferring the control related packets to/from the network driver means at higher priority than communication packets to be transferred between the TCP/IP driver means and the network driver means.

* * * * *